US008978867B2

(12) United States Patent
Kim

(10) Patent No.: US 8,978,867 B2
(45) Date of Patent: Mar. 17, 2015

(54) APPARATUS FOR SETTING PRICE FOR MULTI-VENDING MACHINE AND METHOD THEREOF

(71) Applicant: Lotte Aluminium Co., Ltd., Seoul (KR)

(72) Inventor: Samuel Kim, Incheon (KR)

(73) Assignee: Lotte Aluminium Co., Ltd., Seoul (KR)

( * ) Notice: Subject to any disclaimer, the term of this patent is extended or adjusted under 35 U.S.C. 154(b) by 0 days.

(21) Appl. No.: 14/089,520

(22) Filed: Nov. 25, 2013

(65) Prior Publication Data

US 2014/0151184 A1 Jun. 5, 2014

(30) Foreign Application Priority Data

Dec. 4, 2012 (KR) ........................ 10-2012-0139436

(51) Int. Cl.
*C07F 9/02* (2006.01)
*G07F 9/02* (2006.01)

(52) U.S. Cl.
CPC . *G07F 9/023* (2013.01); *G07F 9/02* (2013.01)
USPC .............. 194/217; 700/238; 705/20; 705/400

(58) Field of Classification Search
CPC ................................... G07F 9/02; G07F 9/023
USPC .......... 194/217; 700/231, 238; 705/14.38, 20, 705/400
See application file for complete search history.

(56) References Cited

U.S. PATENT DOCUMENTS 4,636,963 A * 1/1987 Nakajima et al. ............. 700/238
5,884,745 A * 3/1999 Kalis et al. .................... 194/217

FOREIGN PATENT DOCUMENTS

| | | | |
|---|---|---|---|
| JP | 11-250342 | A | 9/1999 |
| JP | 2002-279497 | A | 9/2002 |
| KR | 10-2010-0087846 | A | 8/2010 |

* cited by examiner

*Primary Examiner* — Mark Beauchaine
(74) *Attorney, Agent, or Firm* — Novick, Kim & Lee, PLLC; Jae Youn Kim

(57) ABSTRACT

Disclosed are an apparatus for setting a price for a multi-vending machine and a method thereof. The apparatus includes a price setting unit for inputting a price setting function, selecting a price setting column and inputting price information about the selected column; a control unit for controlling a price display of the selected column when the column is selected and the price information is input through the price setting unit; and a price display unit for displaying prices of products exhibited in a column according to a price display control of the control unit.

4 Claims, 4 Drawing Sheets

APPARATUS FOR SETTING PRICE FOR MULTI-VENDING MACHINE AND METHOD THEREOF

BACKGROUND

The present invention relates to an apparatus for setting a price for a multi-vending machine and a method thereof, and more particularly, to an apparatus for setting a price for a multi-vending machine capable of conveniently setting and changing prices of sale products in each column and a method thereof.

In general, a vending machine, which is operated in an unmanned sale scheme, possesses various products, such as coffee, cigarettes, snacks or books, for sale therein and dispenses a product through an outlet to a purchaser who desires to purchase the product when the purchaser selects the product after inserting currency corresponding to the desired product.

Recently, differently from general vending machines, a multi-vending machine for selling various kinds of products through a single machine in an unmanned sale scheme has been proposed.

A multi-vending machine has been disclosed in Korean Patent Unexamined Publication No. 10-2010-0087846 (Published on Aug. 6, 2010; hereinafter, referred to as "related art").

The related art senses whether a shelf protrudes or not. Thus, it is previously prevented that a basket collides against the shelf so that the vending machine can be prevented from being broken caused when the shelf is not fully input into a product showcase. In addition, products in the showcase can be prevented from falling down from the shelf due to the movement of the machine and the basket accurately moves up and down without any errors. Further, a banner advertisement, which appears and disappears as the basket moves up and down, is provided, so that an observer feels fun, so additional profit may be obtained.

However, according to the related art, when the prices of the products of each column provided in a plurality of shelves are set, since a manager assigns the prices to the products of each self and attaches the tags (in a sticker type) corresponding the assigned prices to each shelf one by one, it takes many time to set the prices to the products and, in addition, it is very inconvenient to manually set the prices to the products.

Specifically, when the prices of the products are changed after the price tags are attached to each column, since new price tags must be attached again after removing the previous price tags, it is very troublesome and takes many time to change the price tags.

SUMMARY

Accordingly, it is an object of the present invention to provide an apparatus for setting a price for a multi-vending machine capable of conveniently setting prices to products of each column and changing the prices, and a method thereof.

It is another object of the present invention to provide an apparatus for setting a price for a multi-vending machine in which, when the prices of the products of each column are set, if a manager selects a column and inputs information about only the product prices through a keypad, a main controller automatically transfers the information about the prices of the selected column such that the prices of the column can be displayed, and a method thereof.

According to one aspect of the present invention, there is provided an apparatus for setting a price for a multi-vending machine. The apparatus includes a price setting unit for inputting a price setting function, selecting a price setting column and inputting price information about the selected column; a control unit for controlling a price display of the selected column when the column is selected and the price information is input through the price setting unit; and a price display unit for displaying prices of products exhibited in a column according to a price display control of the control unit.

According to another aspect of the present invention, there is provided a method of automatically setting a price by a price setting apparatus of a multi-vending machine. The method includes a) when the multi-vending machine is powered on, detecting a shelf through a shelf detecting unit to store information about the shelf and a column based on a detection result in a memory; b) identifying whether a price setting is requested, and receiving column selecting information and price information through a price setting unit when the price setting is requested; and c) determining whether a column selected in step b) exists, transmitting set price information based on the received price information to a price display unit to automatically set a price of a product for sale when the column selected in step b) exists.

According to the present invention, it is possible to conveniently set the prices to the products of each column and change the prices.

Further, if a manager selects a column and inputs information about only the product prices through a keypad, the main controller (control unit) automatically transfers the information about the prices of the selected column such that the prices of the column can be automatically set, so the time taken to set the price information to a specific column may be reduced.

In addition, if any columns selected by a manager do not exist when setting the prices, the apparatus informs the manager of the fact to allow the manager to accurately perform the price setting of a column.

DETAILED DESCRIPTION OF THE EMBODIMENTS

Hereinafter, the embodiments will be described with reference to the accompanying drawings. In the following description, if detailed description about well-known functions or configurations may make the subject matter of the disclosure unclear, the detailed description will be omitted.

Figure 1A:
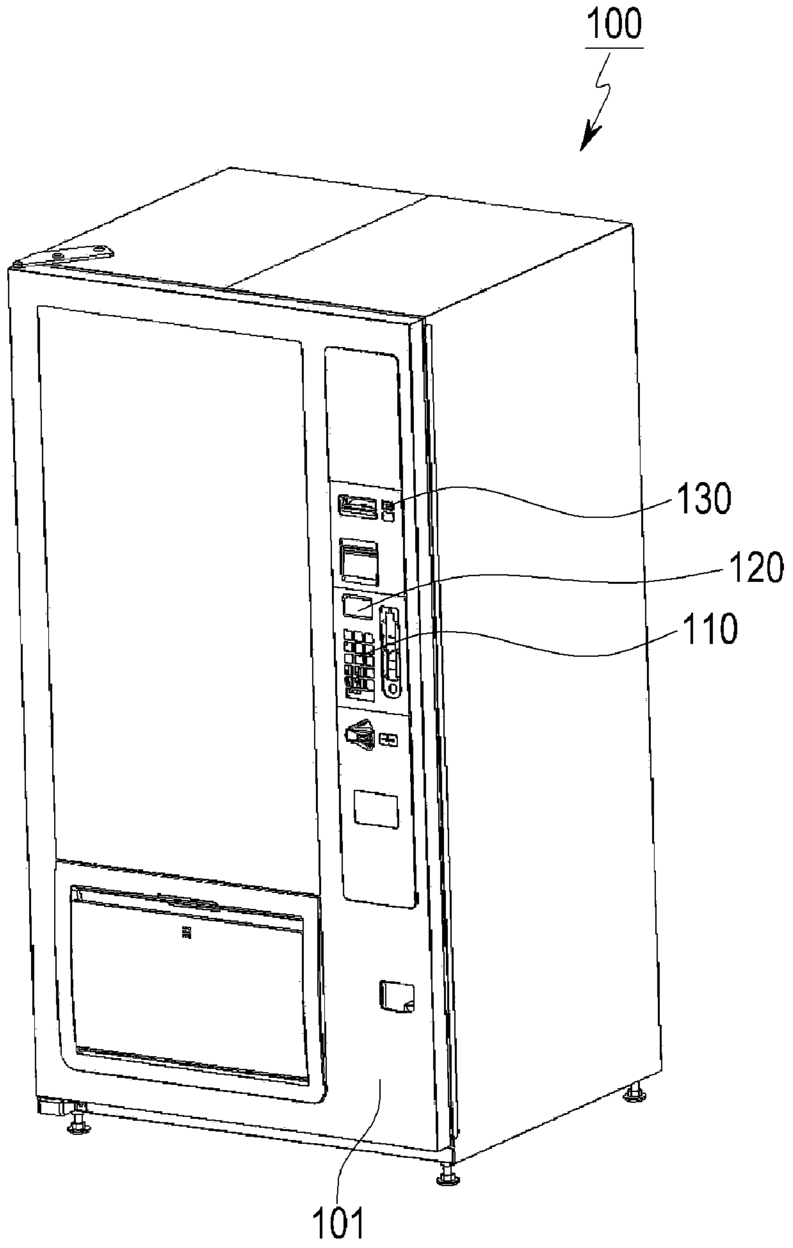
FIGS. 1A and 1B are schematic perspective views showing a multi-vending machine to which an apparatus for setting a price according to the present invention is applied.
Figure 1B:
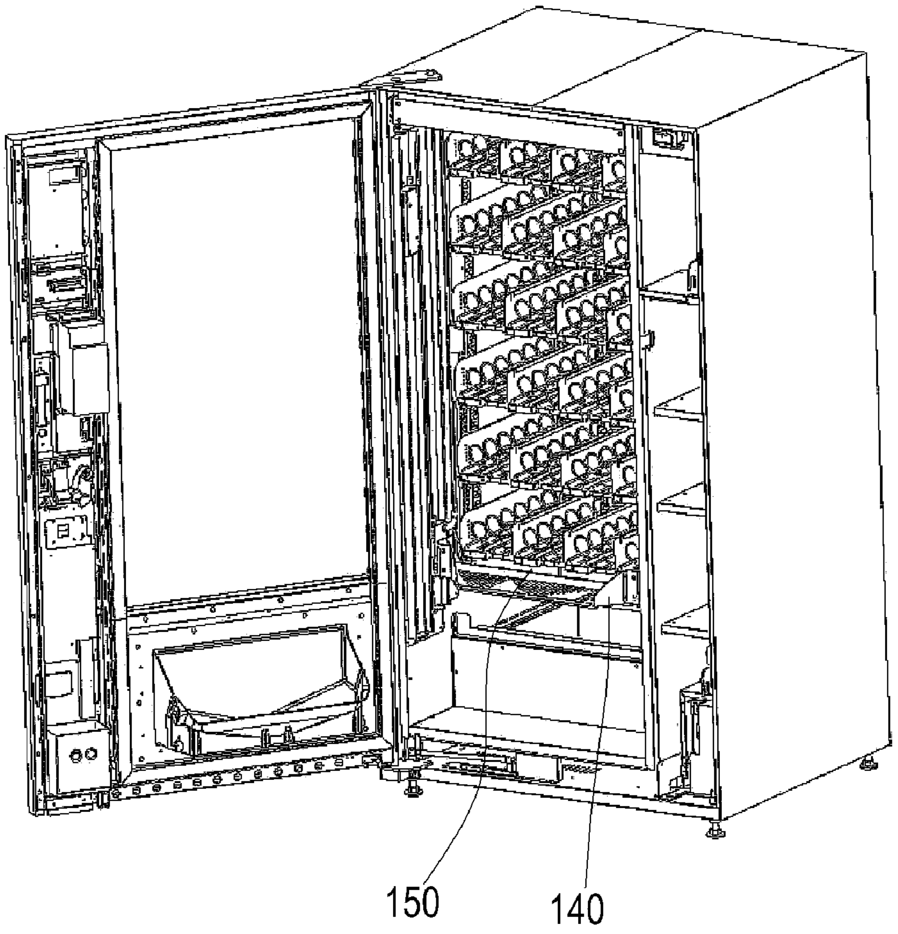
Figure 2:
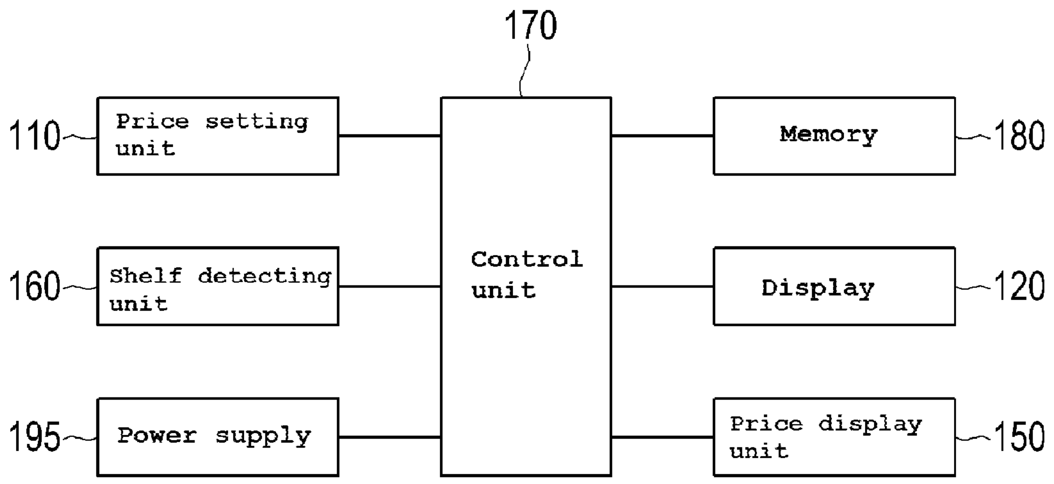
FIG. 2 is a block diagram showing an apparatus for setting a price for a multi-vending machine according to an embodiment of the present invention.

FIGS. 1A and 1B are schematic perspective views showing a multi-vending machine to which an apparatus for setting a price according to the present invention is applied. FIG. 2 is a block diagram showing an apparatus for setting a price for a multi-vending machine according to an embodiment of the present invention. The apparatus for setting a price for a multi-vending machine according to an embodiment of the present invention includes a main body 101, a price setting unit 110, a display 120, speaker 130, a lift 140, a price display unit 150, a shelf detecting unit 160, a control unit 170, a memory 180 and a power supply 195.

The power supply 195 supplies a driving power to the multi-vending machine. The price setting unit 110 is an input unit for inputting a price setting function, selecting a column of which prices will be set, and for inputting price information about the selected column. Preferably, the price setting unit 110 may be conventionally implemented with a keypad. A user selects a product through the price setting unit 110 to purchase the product.

The display 120 may be configured by a liquid crystal display (LCD). The display 120 displays information about a price input by a user, information about a selected column and information about prices of the selected column. The speaker 13 outputs a sound for an advertisement, or a warning sound when the user selected column is not exist while a price setting function is operated.

The lift 140 transfers a product for sale to a product outlet while the lift 140 goes up and down along the showcase in which products are exhibited.

The price display unit 150 displays the prices of the products exhibited in a column for sale. Preferably, the price display unit 150 may be implemented with an FND (Flexible Numeric Display) having a plurality of light emitting diodes to display Arabic numerals or an LCD. The FND may be conventionally a device which includes seven LEDs connected to each other in a common cathode or common anode to display Arabic numbers.

The shelf detecting unit 160 detects whether a shelf exists in the multi-vending machine. The shelf detecting unit 160 may be implemented with a non-contact sensor such as an optical sensor or a distance sensor, or a contact sensor such as a touch sensor or a limit sensor. A plurality of columns for exhibiting products may be provided in the shelf. The information about the columns may be automatically acquired when the information about the shelf is perceived.

When a column is selected and price information is input through the price setting unit 110, the control unit 170 controls the display of the prices of the selected column. Preferably, the control unit 170 may be implemented with a conventional control device such as a CPU, a microprocessor, a microcomputer, a controller, or a main controller.

When the prices of the column selected through the price setting unit 110 are previously set, the control unit 170 controls such that the price information, which is previously set and displayed, is changed based on the price information currently input through the price setting unit 110.

As described above, according to the apparatus for setting a price for a multi-vending machine, when a product is selected through the price setting unit 110 after inserting currency corresponding to the price of the selected product, the lift 140 moves to the position at which the selected product is exhibited in the showcase under the control of the control unit 170. Then, when the movement of the lift 140 is completed, the selected product kept in a keeping box drops into the lift 140 so that a product sensor senses the product in the lift 140 and informs the control unit 170 of the sensing result.

Then, the product contained into the lift 140 drops down to a product outlet to allow the purchaser to take the purchased product.

Meanwhile, according to the present invention, besides the selling operation described above, the price of a product exhibited in a column of a shelf for sale may be set and the previously set price may be easily changed.

For example, when the driving power is supplied to the multi-vending machine 100, the power supply 195 supplies the driving power to the control unit 170. When the power is supplied to the control unit 170, the control unit 170 is initiated and stores information about the shelf and column detected by the shelf detecting unit 160 in the memory 180. In this case, the shelf may include a plurality of columns and the information about the columns is combined with the information about the shelf. For example, if it is assumed that one shelf has four columns, the information about the column of number '1' corresponds to the information about the columns of numbers '01', '02', '03' and '04', and the information about the column of number '2' corresponds to the information about the columns of numbers '01', '02', '03' and '04'.

In this case, when the power is supplied to the shelf detecting unit 160 so that the shelf detecting unit 160 is driven, the shelf detecting unit 160 detects whether a shelf exists by using the non-contact sensor such as an optical sensor or a distance sensor, or the contact sensor such as a touch sensor or a limit sensor. In a case that the shelf detecting unit 160 transmits shelf detection information to the control unit 170 through communication as the detection result, the shelf detection information includes shelf identifying information with which the corresponding shelf is identified. Thus, even when the control unit 170 receives a plurality of shelf detection information pieces, the control unit 170 distinguishes the information pieces based on the shelf identifying information included in the shelf detection information. For example, the shelf identifying information may be created by numbering the columns from the uppermost shelf to the lowest shelf, for example shelf number 1, shelf number 2 and shelf number 3. Serial numbers, for example, '01', '02', '03' and '04', are assigned to the columns of each shelf from the most left column to the most right column.

If it is assumed that each shelf includes four columns, shelf 1-01, 1-02, 1-03 and 1-04 are assigned to the columns placed at the uppermost shelf and shelf 2-01, 2-02, 2-03 and 2-04 are assigned to each column of the shelf just below the uppermost shelf.

Thus, the shelf identifying information and column information are stored in the memory 180.

Next, when a manager selects the price setting function through the price setting unit 110 in order to change the information about a column price and after selecting a column to change the price of the column, inputs information about a new price of the selected column, the control unit 170 recognizes the event so that the control unit 170 switches into a price setting mode. In this case, the column selection is performed by inputting the shelf identifying information and the column identifying information such as '1-01' or '2-03'.

In the price setting mode, the information about the shelf and column selected by the manager is compared with the information about the shelf and column stored in the memory 180 such that it is identified whether the information about the shelf and column selected by the manager exists in the memory 180. The reason is because it is meaningless to set a price to an empty column when the shelf and column selected by the manager does not exist. In addition, this process is performed for the purpose of informing the manager of the fact that the manager makes the mistake of selecting a wrong column to set a price.

When the shelf selected by the manager is empty, the control unit 170, the control unit 170 displays the fact and at the same time, outputs an error alarm sound through the speaker 130. Although the information displayed on the display 120 may be variously expressed, it is assumed for convenience in the embodiment of the present invention that the phrase of "Non-existence of Shelf 1" is displayed.

If the error alarm sound is generated when the price information is input, the manager can identify which shelf does not exist and then, selects another shelf and column, so that the error of setting a price to an empty shelf and a waste of time may be prevented.

Meanwhile, when the shelf selected by the manager exists, the control unit 170, the control unit 170 transmits the price information corresponding to the selected column to the price display unit 150 through communication so that the price display unit 150 displays the price information. In this case, if there is no information about the price previously set to the selected column, the manager allows the currently requested price information to be displayed. To the contrary, if the previous price information about the selected column is being currently displayed, the previous price information is changed into the currently received price information. Thus, when the scheme of replacing the previous price information with the current price information is utilized, the manager may change the price of the products exhibited in the column at any time.

According to the present invention, the manager may conveniently set or change price information about each column.

Hereinafter a method of setting a price for a multi-vending machine according to an embodiment of the present invention will described with reference to FIG. 3.

Figure 3:
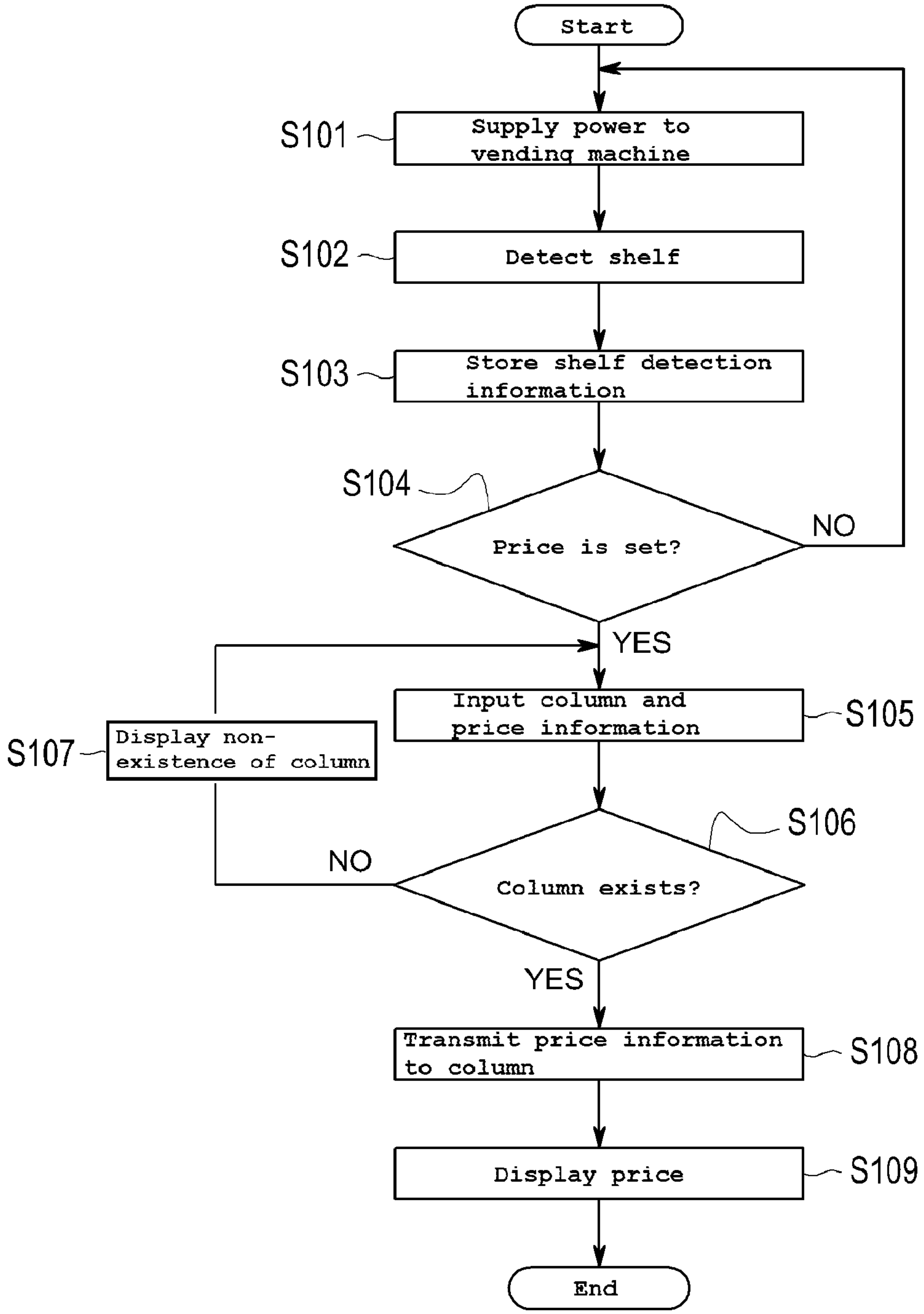
FIG. 3 is a flowchart illustrating a method of setting a price for a multi-vending machine according to an embodiment of the present invention.

FIG. 3 is a flowchart illustrating an apparatus for setting a price for a multi-vending machine according to an embodiment of the present invention. In FIG. 3, 'S' is a step and a process of setting a price, which is performed by the control unit 170, is denoted in software.

As shown in FIG. 3, the method of setting a price for a multi-vending machine according to an embodiment of the present invention includes steps S101 to S103 of, when the multi-vending machine is powered on, detecting a shelf through the shelf detecting unit 160 to store information about the shelf and the columns based on a detection result in the memory 180; steps S104 and S105 of identifying whether a price setting is requested, and receiving column selecting information and price information through the price setting unit 110 when the price setting is requested; steps S106 to S109 of determining whether a column selected in steps S104 and S105 exists, transmitting set price information based on the received price information to the price display unit 150 to automatically set a price of a product for sale when the column selected in steps S104 and S105 exists; and step S107 of displaying nonexistence of the columns when the column selected in steps S104 and S105 does not exist after determining whether the column selected in steps S104 and S105 exists.

According to the method of setting a price for a multi-vending machine according to an embodiment of the present invention, when the power is supplied to the multi-vending machine in step S101, the control unit 170 is initiated in step S102, so that the control unit 1 detects a shelf through the shelf detecting unit 160. For example, an existing shelf is only detected and column information corresponding to the detected shelf is detected.

Then, in step S103, the information about the shelf and column detected by the shelf detecting unit 160 is stored in the memory 180. The shelf information includes the shelf identifying information. Preferably, the shelf identifying information pieces about the shelves are separately stored, respectively.

In this state, if the manager selects the price setting function through the price setting unit 110, the selection of the price setting function is recognized in step S104 and the column selection information and the price information input by the manager through the price setting unit 110 are received in step S105.

In this case, the manager performs the shelf selection and the column information input by selecting Arabic numerals, and inputs the price information about the selected column in Arabic numerals. For example, when 'Self 1-02' and '1,000' are input, the secondary column is selected and the price of 1,000 Won is input.

In step S106, the control unit 170 searches the memory 180 to determine whether the column selected by the manager exists in the memory 180. That is, by searching the memory by using the information about the shelf selected by the manager, it may be easily identified whether the column selected by the manager exists.

As the identifying result in step S106, if the column selected by the manager does not exist, the non-existence of the column is displayed and at the same time, an alarm sound for informing the column selection error is output through the speaker 130 in step S107.

The manager recognizes the fact that the column selected by himself does not exist, so that the manager selects a new column and inputs price information about the new selected column.

To the contrary, when the column selected by the manager exists, the price information about the selected column is transmitted to the price display unit 150 in step S108. In step S109, the price display unit 150 displays the price of the selected column on the display (150).

Therefore, there is no need for a manger to perform the troublesome work of attaching the price information stickers to the columns one by one whenever products are exhibited in columns. Specifically, even when the price of the product exhibited in a column is changed, the inconvenience of attaching the new price sticker to the column after removing the previous price sticker may be improved.

Although an exemplary embodiment of the present invention has been described for illustrative purposes, those skilled in the art will appreciate that various modifications, additions and substitutions are possible, without departing from the scope and spirit of the invention as disclosed in the accompanying claims. In addition to variations and modifications in the component parts and/or arrangements, alternative uses will also be apparent to those skilled in the art.

What is claimed is:

1. An apparatus for setting a price for a multi-vending machine, the apparatus comprising:

a price setting unit for inputting a price setting function, selecting a price setting column and inputting price information about the selected column;

a control unit for controlling a price display of the selected column when the column is selected and the price information is input through the price setting unit;

a price display unit for displaying prices of products exhibited in a column according to a price display control of the control unit;

a speaker configured to make a warning sound when the selected column does not exist; and a shelf detecting unit for detecting a shelf provided in the multi-vending machine, wherein the control unit stores information about the shelf and the column detected by the shelf detecting unit in a memory, and wherein the shelf detecting unit detects the shelf by using one of an optical sensor, a contact sensor and a distance sensor, and transmits information about the shelf to the control unit through communication.

2. The apparatus of claim 1, wherein, when prices of the column selected by the price setting unit are previously set, the control unit controls to change the price information, which is previously set and displayed, based on the price information currently input through the price setting unit.

3. The apparatus of claim 1, wherein the price display unit includes one of a flexible numeric display of displaying Arabic numerals by using a plurality of light emitting diodes and a liquid crystal display.

4. A method of automatically setting a price by a price setting apparatus of a multi-vending machine, the method comprising:

a) when the multi-vending machine is powered on, detecting a shelf through a shelf detecting unit to store information about the shelf and a column based on a detection result in a memory;

b) identifying by a controller whether a price setting is requested, and receiving column selecting information and price information through a price setting unit when the price setting is requested;

c) determining by the controller whether a column selected in step b) exists, transmitting set price information based on the received price information to a price display unit to automatically set a price of a product for sale when the column selected in step b) exists; and d) displaying on a LCD information of the nonexistence of the column and making a warning sound by a speaker when the column selected in step b) does not exist after determining by the controller whether the column selected in step b) exists.

* * * * *